US012677276B2

(12) United States Patent
Maamari et al.

(10) Patent No.: US 12,677,276 B2
(45) Date of Patent: Jul. 7, 2026

(54) UNUSED TRANSMISSION OCCASION UPLINK CONTROL INFORMATION AND POWER HEADROOM REPORT HANDLING IN UPLINK CARRIER AGGREGATION

(71) Applicant: QUALCOMM Incorporated, San Diego, CA (US)

(72) Inventors: Diana Maamari, San Diego, CA (US); Huilin Xu, Temecula, CA (US); Ahmed Attia Abotabl, San Diego, CA (US); Linhai He, San Diego, CA (US)

( * ) Notice: Subject to any disclaimer, the term of this patent is extended or adjusted under 35 U.S.C. 154(b) by 388 days.

(21) Appl. No.: 18/543,500

(22) Filed: Dec. 18, 2023

(65) Prior Publication Data

US 2025/0203607 A1      Jun. 19, 2025

(51) Int. Cl.
| | |
|---|---|
| *H04W 72/1268* | (2023.01) |
| *H04L 5/00* | (2006.01) |
| *H04W 52/36* | (2009.01) |
| *H04W 72/21* | (2023.01) |

(52) U.S. Cl.
CPC ......... *H04W 72/1268* (2013.01); *H04L 5/001* (2013.01); *H04W 52/365* (2013.01); *H04W 72/21* (2023.01)

(58) Field of Classification Search
CPC ........... H04W 72/1268; H04W 52/365; H04W 72/21; H04W 72/115; H04L 5/001
USPC .......................................... 370/329; 455/312
See application file for complete search history.

(56) References Cited

U.S. PATENT DOCUMENTS

| | | | |
|---|---|---|---|
| 2024/0089954 A1* | 3/2024 | Wong ............... | H04W 74/0816 |
| 2024/0260027 A1* | 8/2024 | Han ..................... | H04B 7/022 |
| 2025/0274939 A1* | 8/2025 | Lee ..................... | H04W 72/115 |

* cited by examiner

*Primary Examiner* — Marcos Batista

(57) ABSTRACT

Various aspects of the present disclosure generally relate to wireless communication. In some aspects, a user equipment (UE) may receive, from a network node, an uplink grant that schedules a dynamic grant physical uplink shared channel (DG-PUSCH) on a first component carrier. The UE may transmit, to the network node, unused transmission occasion uplink control information (UTO-UCI) indicating skipping of a configured grant physical uplink shared channel (CG-PUSCH) on a second component carrier in a future CG-PUSCH occasion that overlaps in time with the DG-PUSCH scheduled on the first component carrier. The UE may transmit, to the network node, the DG-PUSCH on the first component carrier, wherein the DG-PUSCH carries a power headroom report (PHR) associated with a power headroom calculation based on an impact of the UTO-UCI indicating skipping of the CG-PUSCH. Numerous other aspects are described.

20 Claims, 10 Drawing Sheets

800 ──▶

810 ─◁ Receive, from a network node, an uplink grant that schedules a dynamic grant physical uplink shared channel (DG-PUSCH) on a first component carrier 820 ─◁ Transmit, to the network node, unused transmission occasion uplink control information (UTO-UCI) indicating skipping of a configured grant physical uplink shared channel (CG-PUSCH) on a second component carrier in a future CG-PUSCH occasion that overlaps in time with the DG-PUSCH scheduled on the first component carrier 830 ─◁ Transmit, to the network node, the DG-PUSCH on the first component carrier, wherein the DG-PUSCH carries a PHR associated with a power headroom calculation based on an impact of the UTO-UCI indicating skipping of the CG-PUSCH

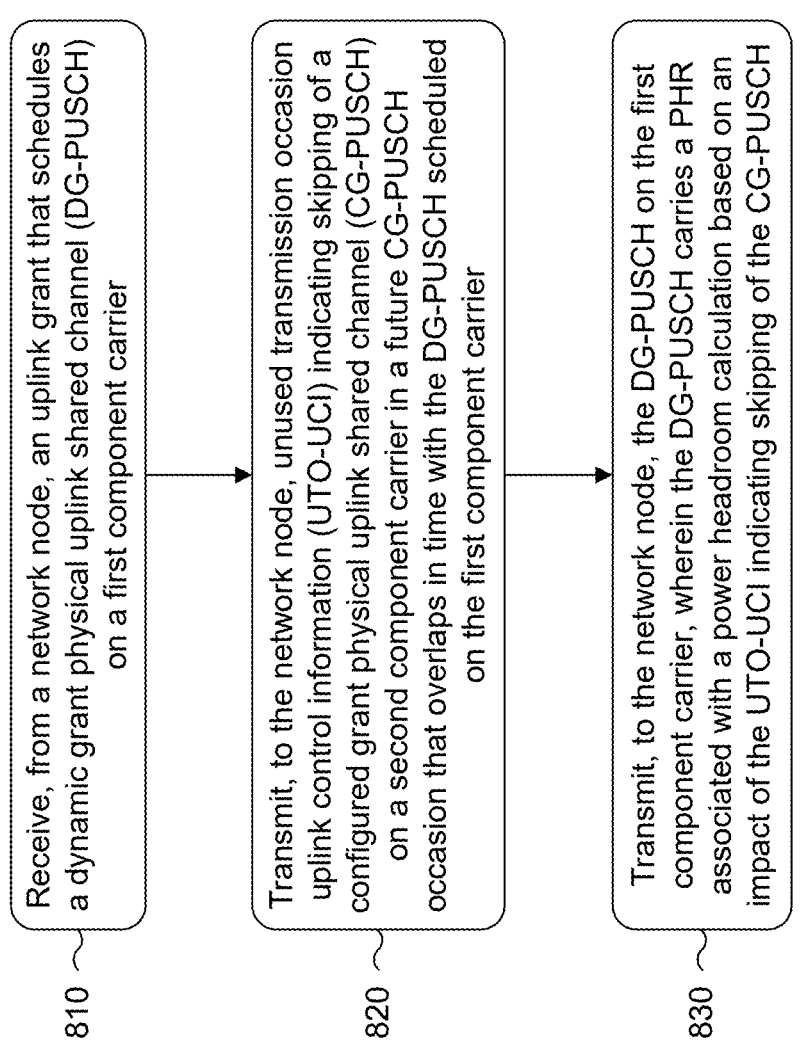

Receive, from a network node, an uplink grant that schedules a dynamic grant physical uplink shared channel (DG-PUSCH) on a first component carrier

810

Transmit, to the network node, unused transmission occasion uplink control information (UTO-UCI) indicating skipping of a configured grant physical uplink shared channel (CG-PUSCH) on a second component carrier in a future CG-PUSCH occasion that overlaps in time with the DG-PUSCH scheduled on the first component carrier

820

Transmit, to the network node, the DG-PUSCH on the first component carrier, wherein the DG-PUSCH carries a PHR associated with a power headroom calculation based on an impact of the UTO-UCI indicating skipping of the CG-PUSCH

Reception Component 902

Communication Manager 906

Transmission Component 904

908

900

UNUSED TRANSMISSION OCCASION UPLINK CONTROL INFORMATION AND POWER HEADROOM REPORT HANDLING IN UPLINK CARRIER AGGREGATION

FIELD OF THE DISCLOSURE

Aspects of the present disclosure generally relate to wireless communication and specifically relate to techniques, apparatuses, and methods for unused transmission occasion uplink control information (UTO-UCI) and power headroom report (PHR) handling in uplink carrier aggregation.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

SUMMARY

Some aspects described herein relate to a method of wireless communication performed by a user equipment (UE). The method may include receiving, from a network node, an uplink grant that schedules a dynamic grant physical uplink shared channel (DG-PUSCH) on a first component carrier. The method may include transmitting, to the network node, unused transmission occasion uplink control information (UTO-UCI) indicating skipping of a configured grant physical uplink shared channel (CG-PUSCH) on a second component carrier in a future CG-PUSCH occasion that overlaps in time with the DG-PUSCH scheduled on the first component carrier. The method may include transmitting, to the network node, the DG-PUSCH on the first component carrier, wherein the DG-PUSCH carries a power headroom report (PHR) associated with a power headroom calculation based on an impact of the UTO-UCI indicating skipping of the CG-PUSCH.

Some aspects described herein relate to a UE for wireless communication. The UE may include one or more memories and one or more processors coupled to the one or more memories. The one or more processors may be configured to cause the UE to receive, from a network node, an uplink grant that schedules a DG-PUSCH on a first component carrier. The one or more processors may be configured to cause the UE to transmit, to the network node, UTO-UCI indicating skipping of a CG-PUSCH on a second component carrier in a future CG-PUSCH occasion that overlaps in time with the DG-PUSCH scheduled on the first component carrier. The one or more processors may be configured to cause the UE to transmit, to the network node, the DG-PUSCH on the first component carrier, wherein the DG-PUSCH carries a PHR associated with a power headroom calculation based on an impact of the UTO-UCI indicating skipping of the CG-PUSCH.

Some aspects described herein relate to a non-transitory computer-readable medium that stores a set of instructions for wireless communication by a UE. The set of instructions, when executed by one or more processors of the UE, may cause the UE to receive, from a network node, an uplink grant that schedules a DG-PUSCH on a first component carrier. The set of instructions, when executed by one or more processors of the UE, may cause the UE to transmit, to the network node, UTO-UCI indicating skipping of a CG-PUSCH on a second component carrier in a future CG-PUSCH occasion that overlaps in time with the DG-PUSCH scheduled on the first component carrier. The set of instructions, when executed by one or more processors of the UE, may cause the UE to transmit, to the network node, the DG-PUSCH on the first component carrier, wherein the DG-PUSCH carries a PHR associated with a power headroom calculation based on an impact of the UTO-UCI indicating skipping of the CG-PUSCH.

Some aspects described herein relate to an apparatus for wireless communication. The apparatus may include means for receiving, from a network node, an uplink grant that schedules a DG-PUSCH on a first component carrier. The apparatus may include means for transmitting, to the network node, UTO-UCI indicating skipping of a CG-PUSCH on a second component carrier in a future CG-PUSCH occasion that overlaps in time with the DG-PUSCH scheduled on the first component carrier. The apparatus may include means for transmitting, to the network node, the DG-PUSCH on the first component carrier, wherein the DG-PUSCH carries a PHR associated with a power headroom calculation based on an impact of the UTO-UCI indicating skipping of the CG-PUSCH.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

FIG. 8 is a flowchart illustrating an example process performed, for example, by a UE, in accordance with the present disclosure.

DETAILED DESCRIPTION

Figure 1:
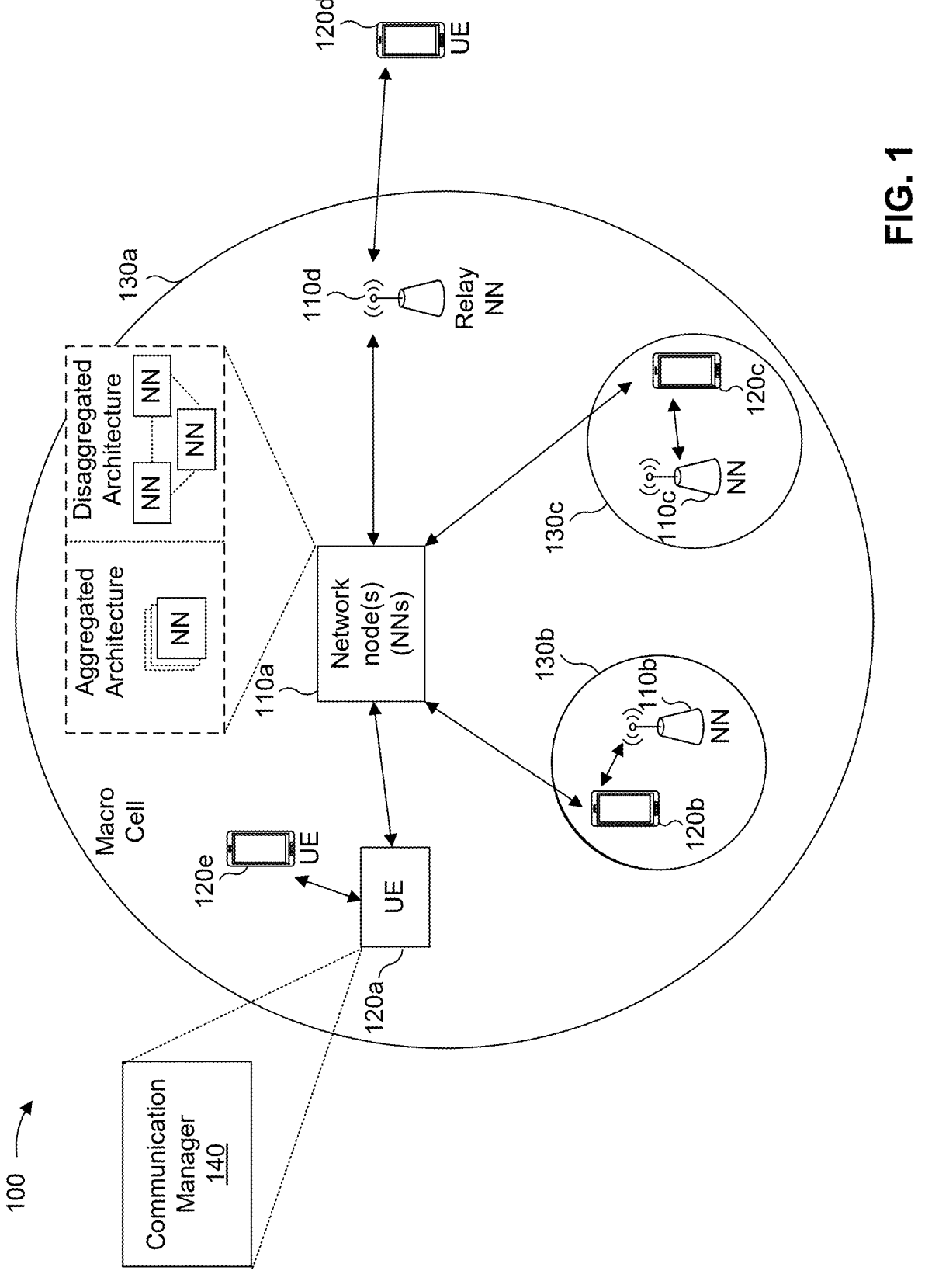
FIG. 1 is a diagram illustrating an example of a wireless network, in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

In a wireless network, a user equipment (UE) may transmit a power headroom report (PHR) to a network node to report the power headroom at the UE. In particular, the power headroom reported to the network node may generally indicate how much remaining transmission power is available for the UE to use in addition to the power being used for one or more current transmissions. For example, in order to calculate the power headroom, the UE may generally subtract a power level associated with one or more physical uplink shared channel (PUSCH) transmissions from a maximum transmission power for the UE. When the power headroom has a positive value, the power headroom value indicates that the UE has available space under the maximum transmission power (e.g., can transmit more uplink data or transmit using a higher transmit power). On the other hand, when the power headroom has a negative value, the power headroom value indicates that the UE is already transmitting at a power level that exceeds the maximum transmission power for the UE. In this way, the network node can use the information carried in the PHR to determine whether the UE has a sufficient power margin to increase transmission power or whether the UE needs to decrease transmission power to maintain balance within the wireless network.

In general, a UE may be configured to transmit a PHR at periodic intervals and/or when a change to a downlink path loss satisfies a threshold. For example, for periodic PHR reporting, a PHR may be triggered when a periodic PHR timer expires. Additionally, or alternatively, for threshold-based reporting, a PHR may be triggered when the change to the downlink path loss satisfies (e.g., equals or exceeds) a configured value (e.g., a number of decibels (dB)), provided that a configurable prohibit timer (e.g., that starts when a UE transmits a PHR) has expired. When a PHR is triggered, whether based on periodic PHR reporting or threshold-based PHR reporting, the UE calculates the power level associated with one or more PUSCH transmissions scheduled for the UE. For example, when the UE receives an uplink grant scheduling a dynamic grant PUSCH (DG-PUSCH) after a PHR is triggered, the UE may calculate the power level associated with the DG-PUSCH to determine the power headroom that is then indicated in a PHR carried in the DG-PUSCH. Similarly, when the UE has an upcoming configured grant PUSCH (CG-PUSCH) occasion after a PHR is triggered, the UE may calculate the power level associated with the CG-PUSCH to determine the power headroom that is then indicated in a PHR carried in the CG-PUSCH. However, in cases where the UE is configured to communicate using uplink carrier aggregation, where the UE can simultaneously transmit a PUSCH on two or more uplink carriers, the UE assumes that each PUSCH scheduled at the time of a PHR transmission will be present when calculating the power headroom. Accordingly, although a UE can skip a CG-PUSCH or a DG-PUSCH in cases where a medium access control (MAC) layer does not generate an uplink protocol data unit (PDU) for the CG-PUSCH or DG-PUSCH, the UE still has to include the skipped PUSCH in the power headroom calculation. As a result, the power headroom indicated in the PHR transmitted to the network node may be inaccurate.

Various aspects relate generally to techniques to consider the impact that a skipped CG-PUSCH occasion has on a power headroom calculation when a UE transmits unused transmission occasion uplink control information (UTO-UCI) to indicate that the CG-PUSCH occasion will be skipped. For example, as described herein, a network node may provide a UE with a CG that preconfigures sufficient uplink resources in accordance with a maximum possible uplink packet size (e.g., to minimize delays for uplink-heavy or delay-sensitive traffic, such as extended reality (XR) uplink video). Accordingly, because over-budgeting uplink resources can lead to wasted uplink resources, a UE may transmit UTO-UCI with a CG-PUSCH to indicate one or more upcoming CG-PUSCH occasions that will be skipped. In this way, in contrast to uplink skipping where a UE may be unable to predict that an uplink PDU will not be available until just prior to the scheduled PUSCH occasion, UTO-UCI allows the UE to indicate that a CG-PUSCH will be skipped earlier in time such that the power headroom calculation can be appropriately adjusted. Accordingly, some aspects described herein more specifically relate to techniques whereby a UE may calculate a power headroom in a manner that considers the impact of a skipped CG-PUSCH occasion when the UE transmits UTO-UCI to indicate that the CG-PUSCH occasion will be skipped at least a threshold amount of time prior to transmission of the PHR.

Particular aspects of the subject matter described in this disclosure can be implemented to realize one or more of the following potential advantages. In some examples, by considering the impact of a skipped CG-PUSCH occasion when calculating power headroom, the UE can calculate a power headroom without unnecessarily assuming that a CG-PUSCH will be transmitted in the CG-PUSCH occasion, which can increase PHR accuracy. In this way, the network node can more accurately determine whether the UE has a sufficient power margin to increase transmission power or whether the UE needs to decrease transmission power.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, XR and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100 in accordance with the present disclosure. The wireless communication network 100 may be or may include elements of a 5G (or NR) network or a 6G network, among other examples. The wireless communication network 100 may include multiple network nodes 110, shown as a network node (NN) 110a, a network node 110b, a network node 110c, and a network node 110d. The network nodes 110 may support communications with multiple UEs 120, shown as a UE 120a, a UE 120b, a UE 120c, a UE 120d, and a UE 120e.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHz), FR2 (24.25 GHz through 52.6 GHz), FR3 (7.125 GHz through 24.25 GHZ), FR4a or FR4-1 (52.6 GHz through 71 GHz), FR4 (52.6 GHz through 114.25 GHz), and FR5 (114.25 GHz through 300 GHz). Although a portion of FR1 is greater than 6 GHz, FR1 is often referred to (interchangeably) as a "Sub-6 GHZ" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHz," if used herein, may broadly refer to frequencies that are less than 6 GHZ, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/LTE and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a MAC layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or an NTN network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110*a* may be a macro network node for a macro cell 130*a*, the network node 110*b* may be a pico network node for a pico cell 130*b*, and the network node 110*c* may be a femto network node for a femto cell 130*c*. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit downlink control information (DCI) (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more PUSCHs. The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The anchor network node 110 may connect to the core network via a wired backhaul link. For example, an Ng interface of the anchor network node 110 may terminate at the core network. Additionally or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. Some anchor network node 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node 110*d* (for example, a relay network node) may communicate with the network node 110a (for example, a macro network node) and the UE 120d in order to facilitate communication between the network node 110a and the UE 120d. Additionally or alternatively, a UE 120 may be or may operate as a relay station that can relay transmissions to or from other UEs 120. A UE 120 that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an XR device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC), UEs, further enhanced eMTC (feMTC) UEs, or enhanced feMTC (efeMTC) UEs, or further evolutions thereof, all of which may be simply referred to as "MTC UEs". An MTC UE may be, may include, or may be included in or coupled with a robot, an uncrewed aerial vehicle, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of URLLC, enhanced mobile broadband (eMBB), and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples.

RedCap UEs may support healthcare environments, building automation, electrical distribution, process automation, transport and logistics, and/or smart city deployments, among other examples.

In some examples, two or more UEs 120 (for example, shown as UE 120a and UE 120e) may communicate directly with one another using sidelink communications (for example, without communicating by way of a network node 110 as an intermediary). As an example, the UE 120a may directly transmit data, control information, or other signaling as a sidelink communication to the UE 120e. This is in contrast to, for example, the UE 120a first transmitting data in an UL communication to a network node 110, which then transmits the data to the UE 120e in a DL communication. In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110) may perform, or collaborate or negotiate with one or more other UEs to perform, scheduling operations, resource selection operations, and/or other operations for sidelink communications.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some RATs may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

In some aspects, the UE 120 may include a communication manager 140. As described in more detail elsewhere herein, the communication manager 140 may receive, from a network node 110, an uplink grant that schedules a DG-PUSCH on a first component carrier; transmit, to the network node 110, UTO-UCI indicating skipping of a CG-PUSCH on a second component carrier in a future CG-PUSCH occasion that overlaps in time with the DG-PUSCH scheduled on the first component carrier; and transmit, to the network node 110, the DG-PUSCH on the first component carrier, wherein the DG-PUSCH carries a PHR associated with a power headroom calculation based on an impact of the UTO-UCI indicating skipping of the CG-PUSCH. Additionally, or alternatively, the communication manager 140 may perform one or more other operations described herein.

As indicated above, FIG. 1 is provided as an example. Other examples may differ from what is described with regard to FIG. 1.

Figure 2:
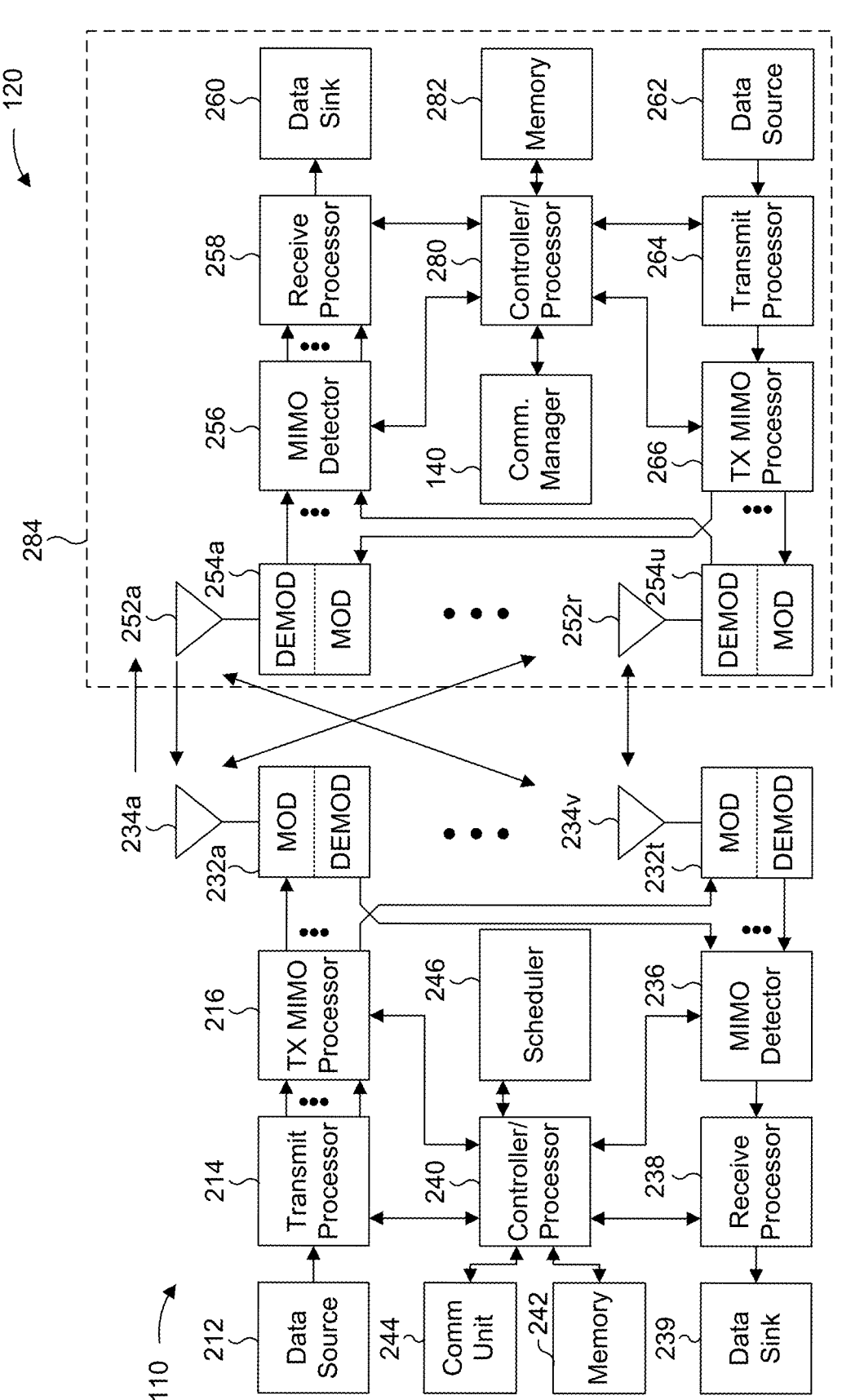
FIG. 2 is a diagram illustrating an example network node in communication with a user equipment (UE) in a wireless network, in accordance with the present disclosure.

FIG. 2 is a diagram illustrating an example network node 110 in communication with an example UE 120 in a wireless network in accordance with the present disclosure.

As shown in FIG. 2, the network node 110 may include a data source 212, a transmit processor 214, a transmit (TX) MIMO processor 216, a set of modems 232 (shown as 232a through 232t, where t≥1), a set of antennas 234 (shown as 234a through 234v, where v≥1), a MIMO detector 236, a receive processor 238, a data sink 239, a controller/processor 240, a memory 242, a communication unit 244, a scheduler 246, and/or a communication manager 150, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more MCSs for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing (OFDM)) to obtain an output sample stream. Each modem 232 may further use the respective modulator component to process (for example, convert to analog, amplify, filter, and/or upconvert) the output sample stream to obtain a time domain downlink signal. The modems 232a through 232t may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252a through 252r, where r≥1), a set of modems 254 (shown as modems 254a through 254u, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink sounding reference signal (SRS), and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254a through 254u may transmit a set of uplink signals (for example, R uplink signals or U uplink symbols) via the corresponding set of antennas 252. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 120 or network nodes 110 may include different numbers of antenna elements. For example, a UE 120 may include a single antenna element, two antenna elements, four antenna elements, eight antenna elements, or a different number of antenna elements. As another example, a network node 110 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

Figure 3:
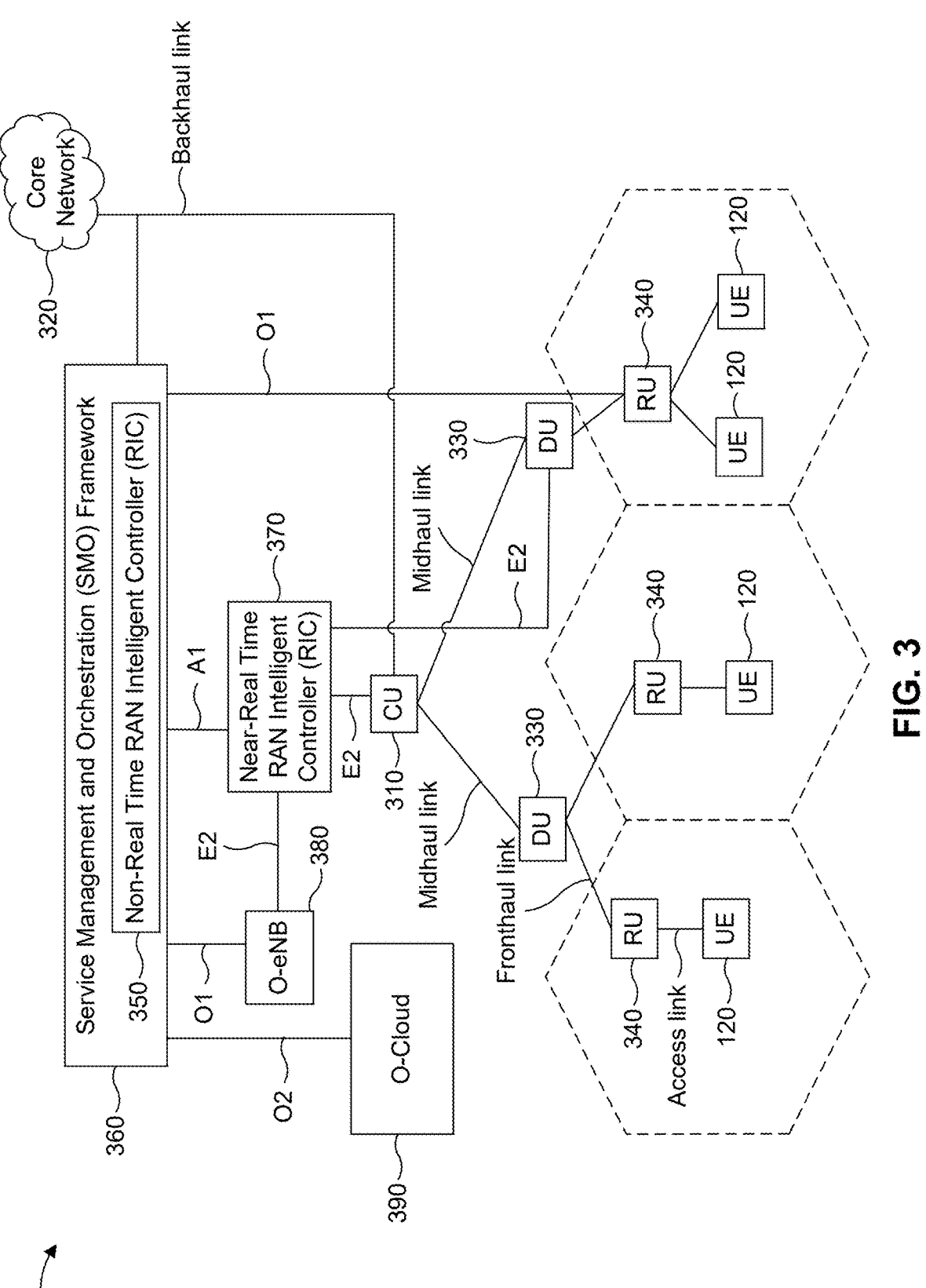
FIG. 3 is a diagram illustrating an example disaggregated base station architecture, in accordance with the present disclosure.

FIG. 3 is a diagram illustrating an example disaggregated base station architecture 300 in accordance with the present disclosure. One or more components of the example disaggregated base station architecture 300 may be, may include, or may be included in one or more network nodes (such one or more network nodes 110). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 370 (for example, via an E2 link). The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUs 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU-UP units and one or more CU-CP units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-eNB) 380, via an O1 interface. Additionally or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 350 may include or may implement a logical function that enables non-real-time control and optimization of RAN elements and resources, AI/ML workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

As indicated above, FIG. 3 is provided as an example. Other examples may differ from what is described with regard to FIG. 3.

The network node 110, the controller/processor 240 of the network node 110, the UE 120, the controller/processor 280 of the UE 120, the CU 310, the DU 330, the RU 340, or any other component(s) of FIG. 1, 2, or 3 may implement one or more techniques or perform one or more operations associated with UTO-UCI and PHR handling in uplink carrier aggregation, as described in more detail elsewhere herein. For example, the controller/processor 240 of the network node 110, the controller/processor 280 of the UE 120, any other component(s) of FIG. 2, the CU 310, the DU 330, or the RU 340 may perform or direct operations of, for example, process 800 of FIG. 8 or other processes as described herein (alone or in conjunction with one or more other processors). The memory 242 may store data and program codes for the network node 110, the network node 110, the CU 310, the DU 330, or the RU 340. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU 310, the DU 330, or the RU 340, may cause the one or more processors to perform process 800 of FIG. 8 or other processes as described herein. In some examples, executing instructions may include running the instructions, converting the instructions, compiling the instructions, and/or interpreting the instructions, among other examples.

In some aspects, the UE 120 includes means for receiving, from a network node 110, an uplink grant that schedules a DG-PUSCH on a first component carrier; means for transmitting, to the network node 110, UTO-UCI indicating skipping of a CG-PUSCH on a second component carrier in a future CG-PUSCH occasion that overlaps in time with the DG-PUSCH scheduled on the first component carrier; and/or means for transmitting, to the network node 110, the DG-PUSCH on the first component carrier, wherein the DG-PUSCH carries a PHR associated with a power headroom calculation based on an impact of the UTO-UCI indicating skipping of the CG-PUSCH. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

Figure 4:
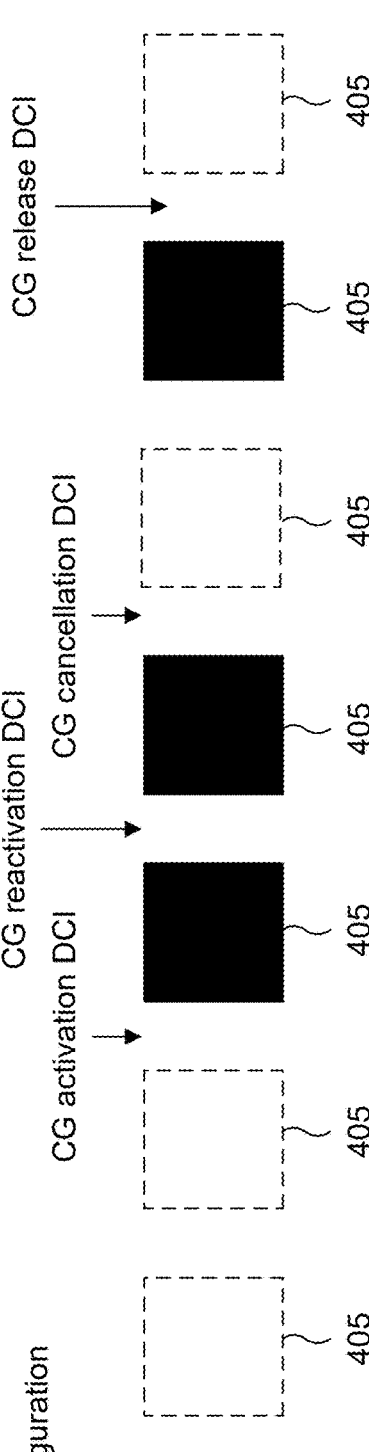
FIG. 4 is a diagram illustrating an example of uplink configured grant (CG) communication, in accordance with the present disclosure.

FIG. 4 is a diagram illustrating an example 400 of uplink CG communication, in accordance with the present disclosure. CG communications may include periodic uplink communications that are configured for a UE 120, such that a network node 110 does not need to send separate DCI to schedule each uplink communication, thereby conserving signaling overhead. Additionally, or alternatively, configuring periodic uplink resources for the UE 120 may avoid dynamic resource requests from the UE 120 based on a scheduling request (SR) and/or buffer status report (BSR) and corresponding resource assignment by the network node 110, whereby CG communications may be useful for low-latency periodic traffic (e.g., XR uplink video or the like).

As shown in example 400, a UE 120 may be configured with a CG configuration for CG communications. For example, the UE 120 may receive the CG configuration via an RRC message transmitted by a network node 110. The CG configuration may indicate a resource allocation associated with CG uplink communications (e.g., in a time domain, frequency domain, spatial domain, and/or code domain) and a periodicity at which the resource allocation is repeated, resulting in periodically reoccurring scheduled CG occasions 405 for the UE 120. In some examples, the CG configuration may identify a resource pool or multiple resource pools that are available to the UE 120 for an uplink transmission. The CG configuration may configure contention-free CG communications (e.g., where resources are dedicated for the UE 120 to transmit uplink communications) or contention-based CG communications (e.g., where the UE 120 contends for access to a channel in the configured resource allocation, such as by using a channel access procedure or a channel sensing procedure).

The network node 110 may transmit CG activation DCI to the UE 120 to activate the CG configuration for the UE 120. The network node 110 may indicate, in the CG activation DCI, communication parameters, such as an MCS, an resource block (RB) allocation, and/or antenna ports, for the CG-PUSCH communications to be transmitted in the scheduled CG occasions 405. The UE 120 may begin transmitting in the CG occasions 405 based at least in part on receiving the CG activation DCI. For example, beginning with a next scheduled CG occasion 405 subsequent to receiving the CG activation DCI, the UE 120 may transmit a CG-PUSCH communication in the scheduled CG occasions 405 using the communication parameters indicated in the CG activation DCI. The UE 120 may refrain from transmitting in CG occasions 405 prior to receiving the CG activation DCI.

The network node 110 may transmit CG reactivation DCI to the UE 120 to change the communication parameters for the CG-PUSCH communications. Based at least in part on receiving the CG reactivation DCI, and the UE 120 may begin transmitting in the scheduled CG occasions 405 using the communication parameters indicated in the CG reactivation DCI. For example, beginning with a next scheduled CG occasion 405 subsequent to receiving the CG reactivation DCI, the UE 120 may transmit CG-PUSCH communications in the scheduled CG occasions 405 based at least in part on the communication parameters indicated in the CG reactivation DCI.

In some cases, such as when the network node 110 needs to override a scheduled CG-PUSCH communication for a higher priority communication, the network node 110 may transmit CG cancellation DCI to the UE 120 to temporarily cancel or deactivate one or more subsequent CG occasions 405 for the UE 120. The CG cancellation DCI may deactivate only a subsequent one CG occasion 405 or a subsequent N CG occasions 405 (where N is an integer). CG occasions 405 after the one or more (e.g., N) CG occasions 405 subsequent to the CG cancellation DCI may remain activated. Based at least in part on receiving the CG cancellation DCI, the UE 120 may refrain from transmitting in the one or more (e.g., N) CG occasions 405 subsequent to receiving the CG cancellation DCI. As shown in example 400, the CG cancellation DCI cancels one subsequent CG occasion 405 for the UE 120. After the CG occasion 405 (or N CG occasions) subsequent to receiving the CG cancellation DCI, the UE 120 may automatically resume transmission in the scheduled CG occasions 405.

The network node 110 may transmit CG release DCI to the UE 120 to deactivate the CG configuration for the UE 120. The UE 120 may stop transmitting in the scheduled CG occasions 405 based at least in part on receiving the CG release DCI. For example, the UE 120 may refrain from transmitting in any scheduled CG occasions 405 until another CG activation DCI is received from the network node 110. Whereas the CG cancellation DCI may deactivate only a subsequent one CG occasion 405 or a subsequent N CG occasions 405, the CG release DCI deactivates all subsequent CG occasions 405 for a given CG configuration for the UE 120 until the given CG configuration is activated again by a new CG activation DCI.

As indicated above, FIG. 4 is provided as an example. Other examples may differ from what is described with respect to FIG. 4.

Figure 5A:
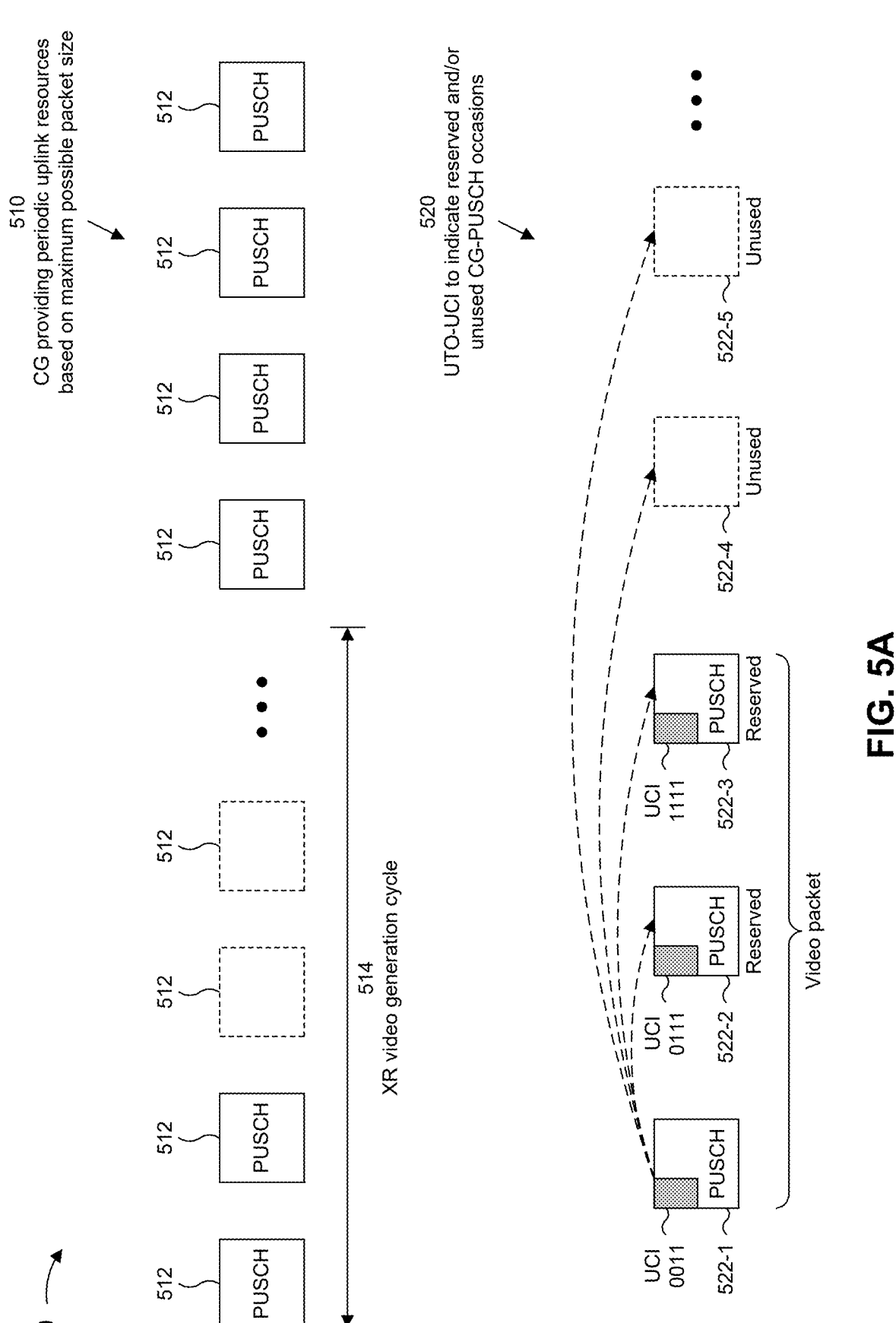
FIGS. 5A-5B are diagrams illustrating examples of unused transmission occasion uplink control information (UTO-UCI) for indicating unused uplink CG physical uplink shared channel (PUSCH) occasions, in accordance with the present disclosure.
Figure 5B:
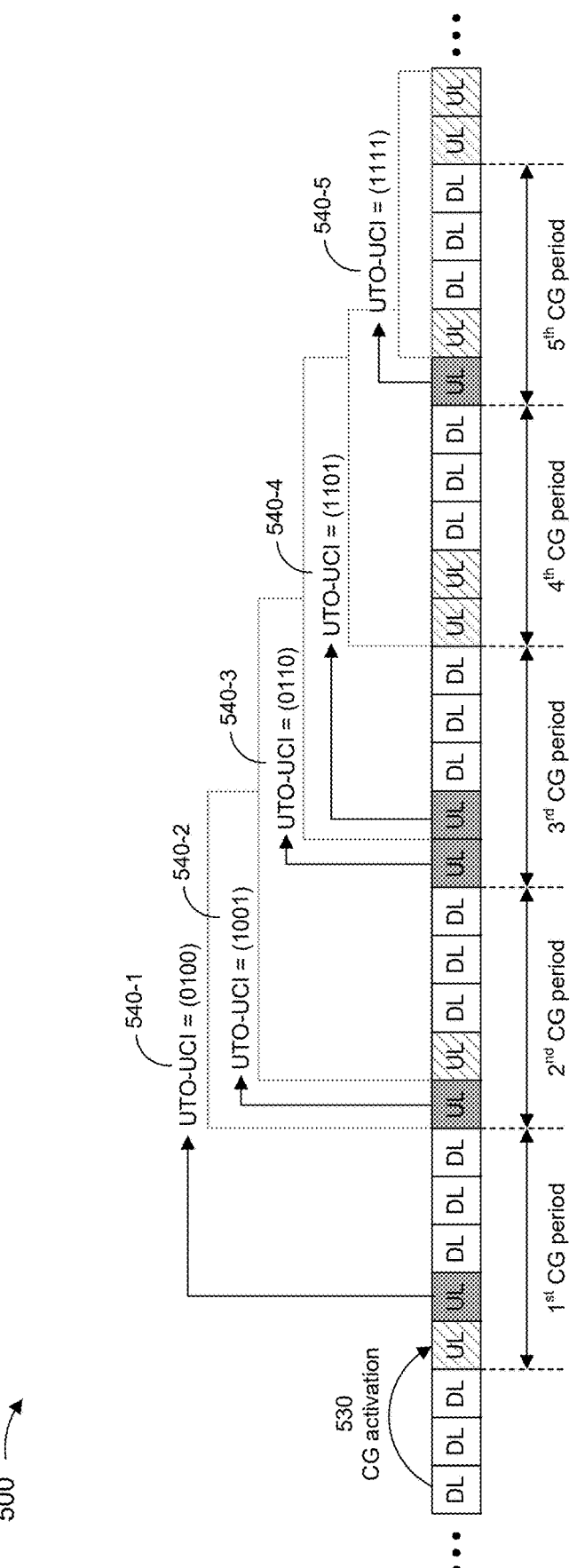

FIGS. 5A-5B are diagrams illustrating examples 500 of UTO-UCI for indicating unused uplink CG-PUSCH occasions, in accordance with the present disclosure. As described herein, a CG generally provides a UE 120 with periodic uplink resources such that a network node does not need to send separate DCI to schedule each uplink communication, thereby conserving signaling overhead. Furthermore, a CG avoids SR-based and/or BSR-based dynamic resource requests from the UE 120 and corresponding resource assignment by the network node, which makes CG communications useful for low-latency or uplink-heavy traffic (e.g., XR traffic).

Accordingly, certain uplink traffic types (e.g., voice, XR video, and/or XR control or pose data) may be transmitted in periodic CG-PUSCH occasions. For example, as shown FIG. 5A, and by reference number 510, a network node 110 may provide a UE 120 with a CG configuration (e.g., via an RRC message) that indicates an uplink resource allocation (e.g., in a time domain, frequency domain, spatial domain, and/or code domain) and a periodicity at which the uplink resource allocation is repeated, resulting in periodically recurring scheduled CG-PUSCH occasions 512 that the UE 120 can use to transmit uplink data. In some cases, the network node 110 may configure the CG-PUSCH occasions 512 to ensure that sufficient uplink resources are allocated to the UE 120 to support a maximum packet size associated with a particular application that uses the CG-PUSCH occasions 512 to transmit uplink data. For example, unlike voice and/or uplink control and/or pose data, which tend to follow regular traffic patterns and have relatively small packet sizes, XR uplink video may be associated with a video frame size that varies over time and/or quasi-periodic packet arrival times with application jitter (e.g., causing XR traffic arrival times to vary). In other words, video packet size tends to be large and random (e.g., with uplink video packets arriving in bursts, in the sense that many uplink video packets may arrive very closely in time, and then there may be an idle period before a next cycle starts and a next traffic burst arrives).

For example, reference number 514 in FIG. 5A corresponds to an example XR video generation cycle, where uplink video data that arrives in a burst is transmitted in two consecutive CG-PUSCH occasions 512 that are then followed by several CG-PUSCH occasions 512 in which no data is transmitted. As further shown, the XR video generation cycle may then be followed by another burst, where uplink video data that arrives in the second burst is transmitted in four consecutive CG-PUSCH occasions 512. Accordingly, to support XR uplink video and/or other uplink traffic types associated with large and/or random packet sizes (e.g., based on a bursty traffic pattern that may include sudden increases and/or decreases in traffic volumes and/or inter-packet arrival times), the network node 110 may provide the UE 120 with a CG resource allocation that includes sufficient uplink resources to accommodate the largest possible uplink packet size. In this way, the uplink resources provided by the periodic CG-PUSCH occasions 512 may minimize delay or latency associated with the uplink data. However, because the uplink resources are allocated to accommodate the largest possible uplink packet size, the CG resource allocation provided to the UE 120 may be resource-inefficient due to the statistical over-budgeting of the uplink resources. For example, as shown by reference number 514 in FIG. 5A, the uplink resources that are preconfigured within an XR video generation cycle may exceed the average video packet size, which can lead to wasted uplink resources (e.g., the uplink resources associated with the unused CG-PUSCH occasions 512 could have been allocated to other UEs 120).

Accordingly, as shown by reference number 520, a wireless network may support UTO-UCI to allow a UE 120 to indicate one or more unused CG-PUSCH occasions and thereby avoid or mitigate wasted uplink resources. For example, as shown in FIG. 5A, a UE 120 may include UTO-UCI in each CG-PUSCH that the UE 120 transmits in a CG-PUSCH occasion 522, where the UTO-UCI may indicate, for one or more future CG-PUSCH occasions 522, whether the UE 120 is reserving the uplink resources associated with the one or more future CG-PUSCH occasions 522 or skipping the one or more future CG-PUSCH occasions 522 such that the uplink resources can be released and/or reallocated to other UEs 120. In some aspects, the UTO-UCI carried in a CG-PUSCH may contain a bitmap in which each bit indicates whether a future CG-PUSCH occasion 522 is unused or reserved. For example, the UTO-UCI is a bitmap that includes N bits to indicate whether N future CG-PUSCH occasion are unused or reserved, where N is in a range from 3 and 8, and where a value of one indicates that a future CG-PUSCH occasion 522 is unused (e.g., will be skipped) and a zero indicates that the future CG-PUSCH occasion 522 is reserved. For example, in FIG. 5A, the UTO-UCI transmitted with the CG-PUSCH in the first CG-PUSCH occasion 522-1 includes a "0011" to indicate that the next two CG-PUSCH occasions 522-2 and 522-3 are reserved, and that the following two CG-PUSCH occasions 522-4 and 522-5 will be unused. Furthermore, the UTO-UCI transmitted with the CG-PUSCH in the next CG-PUSCH occasion 522-2 includes a "0111" to indicate that the next CG-PUSCH occasion 522-3 is reserved, that future CG-PUSCH occasion 522-4 will be unused, that future CG-PUSCH occasion 522-5 will be unused, and that a subsequent CG-PUSCH occasion not shown in FIG. 5A will be unused. Similarly, the UTO-UCI transmitted with the CG-PUSCH in CG-PUSCH occasion 522-3 includes a "1111" to indicate that the next four CG-PUSCH occasions, starting with CG-PUSCH occasion 522-4, will be unused (e.g., skipped).

Accordingly, as shown in FIG. 5B and described herein, UTO-UCI generally includes a bitmap with Nu bits to indicate whether the next Nu valid CG-PUSCH occasions in a sliding window will be used or unused. For example, Nu may have a value in a range from 3 to 8, which may be configured by RRC signaling, where a minimum of 3 bits may be used to avoid puncturing-based multiplexing of the UTO-UCI in a CG-PUSCH transmission. In general, when the UE 120 transmits a CG-PUSCH in a current CG-PUSCH occasion, the transmitted CG-PUSCH carries UTO-UCI that applies to the Nu consecutive and valid CG-PUSCH occasions that follow the current CG-PUSCH occasion, starting at an offset from the end of the transmitted CG-PUSCH. For example, FIG. 5B illustrates an example timeline where each CG period includes two CG-PUSCH occasions that are followed by three downlink transmission time intervals (TTIs). In the example shown in FIG. 5B, the UE 120 receives a CG activation message 530 from the network node, skips the first CG-PUSCH occasion in the first CG period, and then transmits a CG-PUSCH in the second CG-PUSCH occasion in the first CG period.

Accordingly, as shown, the CG-PUSCH transmitted in the second CG-PUSCH occasion of the first CG period includes UTO-UCI 540-1, which carries a bitmap of "0100" (e.g., Nu=4) to indicate that the UE 120 intends to [not skip/skip/not skip/not skip] the next four CG-PUSCH occasions. Furthermore, in the next CG-PUSCH occasion where the UE 120 transmits a CG-PUSCH (e.g., the first CG-PUSCH occasion of the second CG period), the CG-PUSCH includes UTO-UCI 540-2 that carries a bitmap of "1001" to indicate that the UE 120 intends to [skip/not skip/not skip/skip] the next four CG-PUSCH occasions. The UE 120 then transmits a CG-PUSCH in the first CG-PUSCH occasion of the third CG period, which includes UTO-UCI 540-3 that carries a bitmap of "0110" to indicate that the UE 120 intends to [not skip/skip/skip/not skip] the next four CG-PUSCH occasions. The UE 120 next transmits a CG-PUSCH in the second CG-PUSCH occasion of the third CG period, which includes UTO-UCI 540-4 that carries a bitmap of "1101" to indicate that the UE 120 intends to [skip/skip/not skip/skip] the next four CG-PUSCH occasions, and next transmits a CG-PUSCH in the first CG-PUSCH occasion of the fifth CG period (after skipping both CG-PUSCH occasions in the fourth CG period), where the CG-PUSCH transmitted in the first CG-PUSCH occasion of the fifth CG period includes UTO-UCI 540-5 that carries a bitmap of "1111" to indicate that the UE 120 intends to skip the next four CG-PUSCH occasions. In this way, the network node 110 may identify future CG-PUSCH occasions that the UE 120 intends to skip based on the UTO-UCI 540 and may reallocate the uplink resources associated with the unused CG-PUSCH occasions.

As indicated above, FIGS. 5A-5B are provided as examples. Other examples may differ from what is described with respect to FIGS. 5A-5B.

Figure 6:
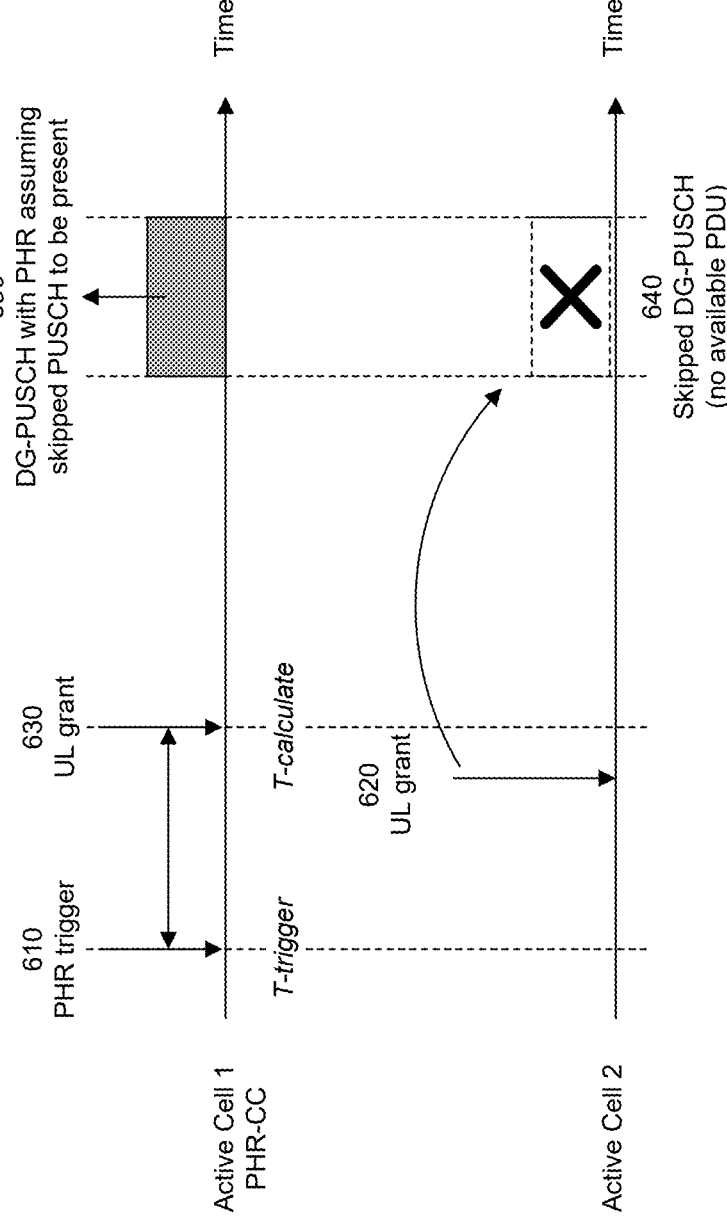
FIG. 6 is a diagram illustrating an example of uplink skipping and power headroom report (PHR) handling in uplink carrier aggregation, in accordance with the present disclosure.

FIG. 6 is a diagram illustrating an example 600 of uplink skipping and PHR handling in uplink carrier aggregation, in accordance with the present disclosure.

For example, as described herein, a UE 120 may transmit a PHR to a network node 110 to report the power headroom at the UE 120. In particular, the power headroom reported to the network node 110 may generally indicate how much remaining transmission power is available for the UE 120 to use in addition to the power being used for one or more current transmissions. For example, in order to calculate the power headroom, the UE 120 may generally subtract a power level associated with one or more PUSCH transmissions from a maximum transmission power for the UE 120. When the power headroom has a positive value, the power headroom value indicates that the UE 120 has available space under the maximum transmission power (e.g., can transmit more uplink data or transmit using a higher transmit power). On the other hand, when the power headroom has a negative value, the power headroom value indicates that the UE 120 is already transmitting at a power level that exceeds the maximum transmission power for the UE 120. In this way, the network node 110 can use the information carried in the PHR to determine whether the UE 120 has a sufficient power margin to increase transmission power or whether the UE 120 needs to decrease transmission power (e.g., to maintain balance within the wireless network).

In general, a UE 120 may be configured to transmit a PHR at periodic intervals and/or when a change to a downlink path loss satisfies a threshold. For example, for periodic PHR reporting, a PHR may be triggered when a periodic PHR timer expires. Additionally, or alternatively, for threshold-based reporting, a PHR may be triggered when the change to the downlink path loss satisfies (e.g., equals or exceeds) a configured value (e.g., a number of dB), provided that a configurable prohibit timer (e.g., that starts when a UE 120 transmits a PHR) has expired. When a PHR is triggered, whether based on periodic PHR reporting or threshold-based PHR reporting, the UE 120 calculates the power level associated with one or more PUSCH transmissions scheduled for the UE 120. For example, when the UE 120 receives an uplink grant scheduling a DG-PUSCH after a PHR is triggered, the UE 120 may calculate the power level associated with the DG-PUSCH to determine the power headroom that is then indicated in a PHR carried in the DG-PUSCH. Similarly, when the UE 120 has an upcoming CG-PUSCH occasion after a PHR is triggered, the UE 120 may calculate the power level associated with the CG-PUSCH to determine the power headroom that is then indicated in a PHR carried in the CG-PUSCH.

In cases where the UE 120 is configured to communicate with the network node using uplink carrier aggregation, the UE 120 may be configured with an uplink carrier that the UE 120 uses to transmit a PHR and with one or more additional uplink carriers. For example, FIG. 6 illustrates an uplink carrier aggregation configuration in which the UE 120 is configured with a first active cell, shown as PHR-CC, that the UE 120 uses to transmit a PHR, and with a second active cell that the UE 120 can use to transmit uplink data. Accordingly, when a PHR is triggered for the UE 120, the UE 120 may calculate a power headroom to be indicated in the PHR based on each PUSCH that is scheduled for the UE 120 at a time when the UE 120 receives an uplink grant to schedule a DG-PUSCH on the PHR-CC. For example, as shown by reference number 610, a PHR may be triggered for the UE 120 at a first time, shown as T-trigger, where the PHR may be triggered based a periodic PHR timer expiring and/or based on a change to a downlink path loss satisfying a threshold. As further shown by reference number 620, the UE 120 receives an uplink grant that schedules a DG-PUSCH on the second uplink carrier at a second time. Furthermore, as shown by reference number 630, the UE 120 receives an uplink grant that schedules a DG-PUSCH on the PHR-CC at a third time, shown as T-calculate.

Accordingly, when the UE 120 receives the uplink grant that schedules the DG-PUSCH on the PHR-CC, the UE 120 calculates the power headroom to be indicated in the PHR based on an assumption that each scheduled PUSCH that overlaps with the DG-PUSCH on the PHR-CC will be transmitted. For example, when the UE 120 first detects a DCI message that schedules an initial TB transmission after the PHR is triggered and the PHR is to be carried in a DG-PUSCH scheduled by the DCI message, the UE 120 generally calculates the power headroom to be indicated in the PHR based on an assumption that any CG-PUSCH and/or SRS transmissions overlapping in time with the DG-PUSCH will be transmitted and that any DG-PUSCH scheduled in uplink grants received prior to and including a PDCCH monitoring occasion where the first DCI message is detected will be transmitted. For example, in the scenario shown in FIG. 6, the UE 120 receives the uplink grant on the second active cell prior to the PDCCH monitoring occasion where the uplink grant triggering the DG-PUSCH carrying the PHR is detected (e.g., the uplink grant on the second active cell prior to T-calculate). Accordingly, the UE 120 calculates the power headroom to be indicated in the PHR based on an assumption that the overlapping DG-PUSCH scheduled on the second uplink carrier will be transmitted. Furthermore, a similar approach may be used for any CG-PUSCH occasions that overlap with the DG-PUSCH on the PHR-CC.

However, in some cases, the UE 120 may be permitted to skip a CG-PUSCH and/or a DG-PUSCH in cases where a MAC layer does not generate or deliver an uplink PDU. For example, in some aspects, a network node may configure the UE 120 with a parameter (e.g., skipUplinkTxDynamic) enabling the UE 120 to skip a CG-PUSCH and/or a DG-PUSCH in the event that the MAC layer does not generate an uplink PDU to be transmitted. For example, as shown by reference number 640 in FIG. 6, the UE 120 may skip the DG-PUSCH scheduled by the uplink grant on the second uplink carrier based on the MAC layer not generating an uplink PDU. Nonetheless, when the UE 120 calculates the power headroom to be indicated by the PHR carried in the DG-PUSCH on the PHR-CC, the UE 120 assumes that the DG-PUSCH scheduled on the second uplink carrier will be present. For example, the UE 120 assumes that the DG-PUSCH scheduled on the second uplink carrier will be present because the UE 120 may be unable to determine that an uplink PDU will not be available until just prior to the PUSCH that is skipped. Accordingly, the UE 120 includes any CG-PUSCH or DG-PUSCH in the power headroom calculation that is indicated in the PHR. In this case, as shown by reference number 650, the UE 120 transmits a DG-PUSCH that carries a PHR on the PHR-CC, where the PHR includes an inaccurate power headroom calculation that is based on the (incorrect) assumption that the DG-PUSCH scheduled on the second uplink carrier will be present. As a result, the network node 110 may receive an inaccurate PHR report that overestimates the transmission power used by the UE 120, which may result in the network node unnecessarily reducing the transmission power of the UE 120 and/or applying other power control measures based on the inaccurate PHR report.

Figure 7:
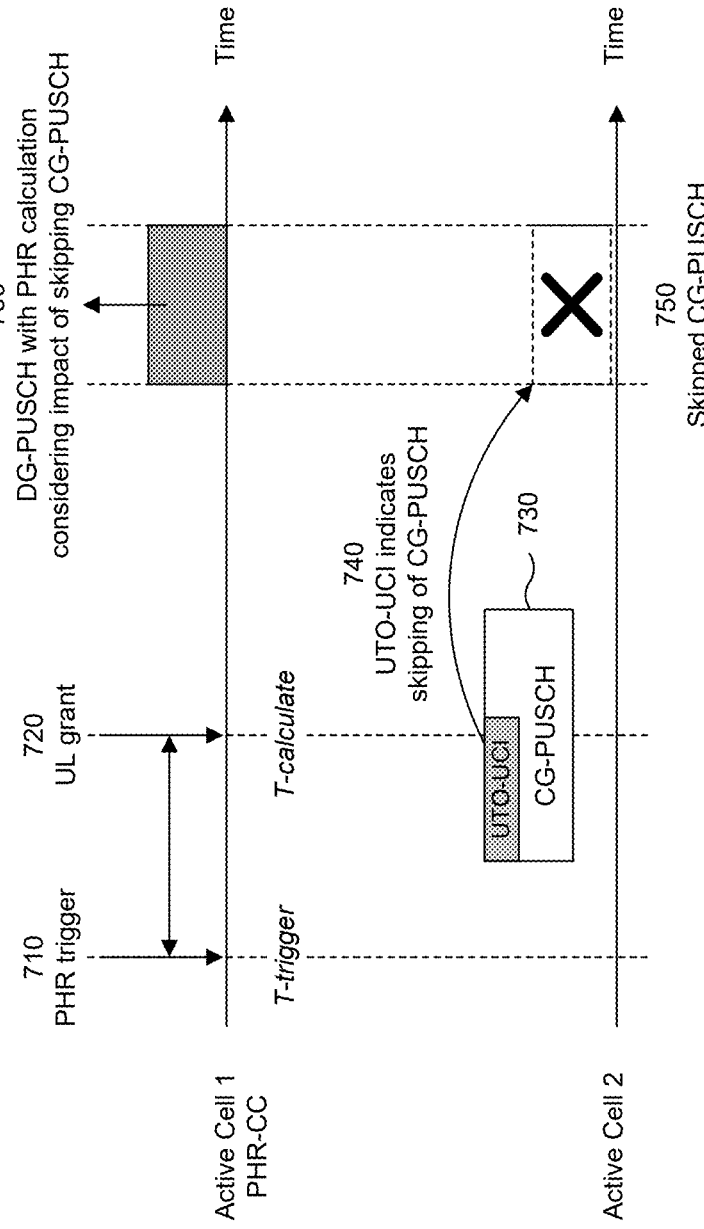
FIG. 7 is a diagram illustrating an example associated with UTO-UCI and PHR handling in uplink carrier aggregation, in accordance with the present disclosure.

Accordingly, as described herein with reference to FIG. 7, various aspects relate generally to techniques to consider the impact that a skipped CG-PUSCH occasion has on a power headroom calculation when a UE 120 transmits UTO-UCI to indicate that the CG-PUSCH occasion will be skipped. For example, in contrast to uplink skipping where a UE 120 may be unable to predict that an uplink PDU will not be available until just prior to the scheduled PUSCH occasion, UTO-UCI allows the UE 120 to indicate that a CG-PUSCH will be skipped earlier in time such that the power headroom calculation can be appropriately adjusted. Accordingly, a UE 120 may calculate a power headroom in a manner that considers the impact of a skipped CG-PUSCH occasion when the UE 120 transmits UTO-UCI to indicate that the CG-PUSCH occasion will be skipped at least a threshold amount of time prior to transmission of the PHR. In this way, the UE 120 can calculate a more accurate power headroom without unnecessarily assuming that a CG-PUSCH will be transmitted in a skipped CG-PUSCH occasion, which can increase PHR accuracy and allow the network node to more accurately determine whether the UE 120 has a sufficient power margin to increase transmission power or whether the UE 120 needs to decrease transmission power.

As indicated above, FIG. 6 is provided as an example. Other examples may differ from what is described with respect to FIG. 6.

FIG. 7 is a diagram illustrating an example 700 associated with UTO-UCI and PHR handling in uplink carrier aggregation, in accordance with the present disclosure. As described herein, example 700 includes communication between a network node 110 and a UE 120. In some aspects, the network node 110 and the UE 120 may communicate in a wireless network, such as wireless network 100. The network node 110 and the UE 120 may communicate via a wireless access link that includes an uplink and a downlink.

In some aspects, in example 700, the network node 110 may configure the UE 120 to communicate on the uplink using uplink carrier aggregation, which generally enables two or more uplink component carriers (sometimes referred to as uplink carriers) to be combined (e.g., into a single channel) for the UE 120 to enhance uplink data capacity (e.g., to support uplink-heavy traffic, such as XR video). In some aspects, the uplink carriers can be combined in the same frequency band or different frequency bands. Additionally, or alternatively, contiguous or non-contiguous uplink carriers can be combined. The network node 110 may configure uplink carrier aggregation for the UE 120, such as in an RRC message, DCI, and/or another signaling message. In uplink carrier aggregation, the UE 120 may be configured with a first uplink carrier or a first active cell (e.g., a primary uplink carrier, which is shown as Active Cell 1 in FIG. 7) and one or more secondary uplink carriers or secondary active cells (e.g., secondary uplink carriers, one of which is shown as Active Cell 2 in FIG. 7). In some aspects, as shown in FIG. 7, the primary uplink carrier may be configured to carry certain control information, such as a PHR. For example, in FIG. 7, the UE 120 is configured to transmit a PHR on the first active cell, which is therefore labelled PHR-CC.

Furthermore, in example 700, the network node 110 may provide the UE 120 with a CG resource allocation for at least the second uplink carrier. For example, as described in more detail elsewhere herein, the network node 110 may provide the UE 120 with a CG configuration (e.g., via an RRC message) that indicates an uplink resource allocation (e.g., in a time domain, frequency domain, spatial domain, and/or code domain) and a periodicity at which the uplink resource allocation is repeated, resulting in periodically recurring scheduled CG-PUSCH occasions that the UE 120 can use to transmit uplink data, such as voice, XR video, and/or XR control or pose data, among other examples. In some cases, the network node 110 may configure the CG-PUSCH occasions to ensure that sufficient uplink resources are allocated to the UE 120 to support a maximum packet size associated with a particular application that uses the CG-PUSCH occasions. Because the CG configuration provided to the 120 includes an uplink resource allocation to accommodate a largest possible uplink packet size, there may be various CG-PUSCH occasions where the UE 120 does not transmit a CG-PUSCH due to the statistical over-budgeting of the preconfigured uplink resources. Accordingly, in each CG-PUSCH occasion where the UE 120 transmits a CG-PUSCH, the UE 120 may include UTO-UCI with the CG-PUSCH, where the UTO-UCI generally includes N bits to indicate whether the intends to skip or reserve N future CG-PUSCH occasions. For example, in some aspects, the UTO-UCI may include a bitmap in which a value of one indicates that the UE 120 intends to skip a corresponding future CG-PUSCH occasion or a zero to indicate that the UE 120 intends to reserve the corresponding future CG-PUSCH occasion for a CG-PUSCH transmission.

As described herein, when the UE 120 receives, on the PHR-CC, an uplink grant that schedules a DG-PUSCH on the PHR-CC after a PHR has been triggered, the UE 120 typically calculates the power headroom to be indicated in the PHR based on an assumption that each scheduled PUSCH that overlaps with the DG-PUSCH on the PHR-CC will be transmitted. For example, when the UE 120 first detects a DCI message that schedules an initial TB transmission after the PHR is triggered and the PHR is to be carried in a DG-PUSCH scheduled by the DCI message, the UE 120 generally calculates the power headroom to be indicated in the PHR based on an assumption that any CG-PUSCH and/or SRS transmissions overlapping in time with the DG-PUSCH will be transmitted and that any DG-PUSCH scheduled in uplink grants received prior to and including a PDCCH monitoring occasion where the first DCI message is detected will be transmitted (e.g., because the UE 120 may be unable to predict that an uplink PDU will not be available until just prior to the scheduled PUSCH occasion). However, when the UE 120 transmits UTO-UCI in a CG-PUSCH, the UTO-UCI can provide an earlier indication that the UE 120 will skip a future CG-PUSCH occasion. Accordingly, provided that the UE 120 transmits and the network node 110 receives UTO-UCI with an indication that a future CG-PUSCH occasion will be skipped early enough, the UE 120 may include the effect of skipping the future CG-PUSCH occasion in the power headroom calculation indicated in the PHR. In this way, when the UE 120 indicates in an earlier CG-PUSCH occasion that the UE 120 intends to skip a future CG-PUSCH occasion, the UE

120 does not need to assume that the skipped CG-PUSCH will be present when calculating the power headroom, which may increase PHR accuracy.

For example, as shown by reference number 710 in FIG. 7, a PHR may be triggered for the UE 120 at a first time, shown as T-trigger, where the PHR may be triggered based a periodic PHR timer expiring and/or based on a change to a downlink path loss satisfying a threshold (provided that a PHR prohibit timer has also expired). As further shown by reference number 720, the UE 120 receives an uplink grant that schedules a DG-PUSCH on the PHR-CC, where the uplink grant that schedules a DG-PUSCH on the PHR-CC is received at a second time, shown as T-calculate. As further shown by reference number 730, the UE 120 transmits, to the network node 110, a CG-PUSCH in a CG-PUSCH occasion that is preconfigured on the second uplink carrier. As further shown by reference number 740, the CG-PUSCH transmitted on the second uplink carrier carries UTO-UCI, which includes an indication that the UE 120 intends to skip a future CG-PUSCH occasion on the second uplink carrier. As further shown by reference number 750, the skipped CG-PUSCH occasion overlaps in time with the DG-PUSCH that is scheduled on the PHR-CC. Accordingly, as shown by reference number 760, the UE 120 may transmit the DG-PUSCH that carries the PHR to the network node 110 on the PHR-CC, where the PHR includes a power headroom calculation that takes into account the effect of the UE 120 skipping the CG-PUSCH on the second uplink carrier.

In some aspects, as described herein, the UE 120 may include the effect of skipping the CG-PUSCH when calculating the power headroom indicated in the PHR in cases where the UE 120 transmits and the network node 110 receives UTO-UCI sufficiently early. For example, in some aspects, the power headroom calculation may take into consideration the effect of skipping the CG-PUSCH in cases where the UTO-UCI with the skipping indication is transmitted at least a threshold amount of time prior to a first symbol of the DG-PUSCH carrying the PHR (e.g., where a time difference between the UTO-UCI and the first symbol of the DG-PUSCH satisfies a threshold). In some aspects, the threshold may have a value associated with a PUSCH preparation time (e.g., as defined in $T_{proc,2}$ parameter), which may be a function of processing capabilities of the UE 120 and/or a numerology associated with an uplink carrier. Accordingly, in some aspects, the UE 120 may consider the impact of skipping the CG-PUSCH in the power headroom calculation in cases where the UTO-UCI with the skipping indication is transmitted no later than $T_{proc,2}$ before the first symbol of the DG-PUSCH carrying the PHR (e.g., the time difference between the UTO-UCI and the first symbol of the DG-PUSCH carrying the PHR equals or exceeds $T_{proc,2}$). Additionally, or alternatively, the threshold may defined as an offset value, $T_{offset}$, where the offset value may be defined in one or more wireless communication standards, configured by the network node 110 (e.g., in RRC signaling, a MAC-CE, or a DCI message), and/or a function of the PUSCH processing time (e.g., $T_{offset} = T_{proc,2}$ plus an offset that may be defined in one or more wireless communication standards and/or configured by the network node 110).

In some aspects, as described herein, a PHR reporting mode in which one or more skipped PUSCH transmissions are considered in a power headroom calculation may be dependent on the UE 120 having an ability to transmit UTO-UCI that includes the skipping indication at least a threshold amount of time prior to the DG-PUSCH carrying the PHR. However, in some cases, a UE 120 may not support UTO-UCI transmission, or may not be configured with a CG resource allocation that allows UTO-UCI with a skipping indication to be transmitted in a CG-PUSCH. Accordingly, in cases where a wireless network supports the PHR reporting mode in which one or more skipped PUSCH transmissions are considered in a power headroom calculation, the wireless network may also support a legacy PHR reporting mode in which a power headroom calculation is based on an assumption that each PUSCH transmission that is configured or scheduled at times up to and including a PDCCH monitoring occasion where the uplink grant scheduling the DG-PUSCH to carry the PHR is received will be present. For example, to support both functionalities, the UE 120 may be configured to transmit, to the network node 110, capability information that indicates whether the UE 120 supports UTO-UCI and/or whether the UE 120 supports a PHR reporting mode in which one or more skipped PUSCH transmissions are considered in a power headroom calculation. Additionally, or alternatively, the network node 110 may transmit, to the UE 120, one or more RRC messages that configure a PHR reporting mode for the UE 120. For example, in some aspects, the UE 120 may be configured to use the PHR reporting mode in which one or more skipped PUSCH transmissions are considered in the power headroom calculation in cases where the PHR reporting mode is supported by the UE 120, UTO-UCI transmission is supported by the UE 120, and/or the UE 120 is configured with a CG resource allocation with UTO-UCI enabled. Alternatively, the UE 120 may be configured to use the legacy PHR reporting mode in cases where the UE 120 does not support the PHR reporting mode that considers UTO-UCI skipping indications, UTO-UCI transmission is unsupported by the UE 120, and/or the UE 120 is not configured with a CG resource allocation or configured with a CG resource allocation with UTO-UCI disabled.

In some aspects, the issues described herein with respect power headroom calculations may similarly apply to uplink power scaling. For example, when a UE 120 is configured with a CG-PUSCH occasion or scheduled to transmit a DG-PUSCH, the UE 120 typically assumes that the CG-PUSCH or DG-PUSCH will be present for uplink power scaling purposes even though the CG-PUSCH or DG-PUSCH might be skipped (e.g., if the MAC layer does not generate an uplink PDU to be transmitted). Accordingly, in some aspects, the UE 120 may include the effect of skipping a CG-PUSCH when performing uplink power scaling in cases where the UE 120 transmits and the network node 110 receives UTO-UCI sufficiently early. For example, in some aspects, the uplink power scaling may take into consideration the effect of skipping the CG-PUSCH in cases where the UTO-UCI with the skipping indication is transmitted at least a threshold time prior to a first symbol of one or more PUSCH transmissions subject to uplink power scaling. For example, in some aspects, the UE 120 may scale the power of the DG-PUSCH transmitted on the first uplink carrier based on the impact of the UTO-UCI including the skipping indication for the overlapping CG-PUSCH. In some aspects, the threshold may have a value associated with a PUSCH preparation time (e.g., as defined in the $T_{proc,2}$ parameter), or the threshold may defined as an offset value, $T_{offset}$, where the offset value may be defined in one or more wireless communication standards, configured by the network node 110, and/or based on the PUSCH processing time (e.g., $T_{offset} = T_{proc,2}$ plus an offset).

As indicated above, FIG. 7 is provided as an example. Other examples may differ from what is described with respect to FIG. 7.

FIG. 8 is a diagram illustrating an example process 800 performed, for example, at a UE or an apparatus of a UE, in accordance with the present disclosure. Example process 800 is an example where the apparatus or the UE (e.g., UE 120) performs operations associated with UTO-UCI and PHR handling in uplink carrier aggregation.

As shown in FIG. 8, in some aspects, process 800 may include receiving, from a network node, an uplink grant that schedules a DG-PUSCH on a first component carrier (block 810). For example, the UE (e.g., using reception component 902 and/or communication manager 906, depicted in FIG. 9) may receive, from a network node, an uplink grant that schedules a DG-PUSCH on a first component carrier, as described above.

As further shown in FIG. 8, in some aspects, process 800 may include transmitting, to the network node, UTO-UCI indicating skipping of a CG-PUSCH on a second component carrier in a future CG-PUSCH occasion that overlaps in time with the DG-PUSCH scheduled on the first component carrier (block 820). For example, the UE (e.g., using transmission component 904 and/or communication manager 906, depicted in FIG. 9) may transmit, to the network node, UTO-UCI indicating skipping of a CG-PUSCH on a second component carrier in a future CG-PUSCH occasion that overlaps in time with the DG-PUSCH scheduled on the first component carrier, as described above.

As further shown in FIG. 8, in some aspects, process 800 may include transmitting, to the network node, the DG-PUSCH on the first component carrier, wherein the DG-PUSCH carries a PHR associated with a power headroom calculation based on an impact of the UTO-UCI indicating skipping of the CG-PUSCH (block 830). For example, the UE (e.g., using transmission component 904 and/or communication manager 906, depicted in FIG. 9) may transmit, to the network node, the DG-PUSCH on the first component carrier, wherein the DG-PUSCH carries a PHR associated with a power headroom calculation based on an impact of the UTO-UCI indicating skipping of the CG-PUSCH, as described above.

Process 800 may include additional aspects, such as any single aspect or any combination of aspects described below and/or in connection with one or more other processes described elsewhere herein.

In a first aspect, the power headroom calculation is based on the impact of the UTO-UCI indicating skipping of the CG-PUSCH based at least in part on a time difference between the UTO-UCI and a first symbol of the DG-PUSCH satisfying a threshold.

In a second aspect, alone or in combination with the first aspect, the threshold has a value associated with a PUSCH preparation time.

In a third aspect, alone or in combination with one or more of the first and second aspects, the threshold has a value associated with a time offset.

In a fourth aspect, alone or in combination with one or more of the first through third aspects, the value associated with the time offset is defined in one or more wireless communication standards.

In a fifth aspect, alone or in combination with one or more of the first through fourth aspects, the value associated with the time offset is a function of a PUSCH preparation time.

In a sixth aspect, alone or in combination with one or more of the first through fifth aspects, process 800 includes receiving, from the network node, RRC signaling that configures a PHR reporting mode enabling the power headroom calculation to be based on the impact of the UTO-UCI indicating skipping of the CG-PUSCH.

In a seventh aspect, alone or in combination with one or more of the first through sixth aspects, process 800 includes transmitting, to the network node, information that indicates a capability to support a PHR reporting mode in which the power headroom calculation is based on the impact of the UTO-UCI indicating skipping of the CG-PUSCH.

In an eighth aspect, alone or in combination with one or more of the first through seventh aspects, process 800 includes scaling power associated with the DG-PUSCH transmitted on the first component carrier based on the impact of the UTO-UCI indicating skipping of the CG-PUSCH.

In a ninth aspect, alone or in combination with one or more of the first through eighth aspects, the power associated with the DG-PUSCH transmitted on the first component carrier is scaled based on the impact of the UTO-UCI indicating skipping of the CG-PUSCH based at least in part on a time difference between the UTO-UCI and a first symbol of the DG-PUSCH satisfying a threshold.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
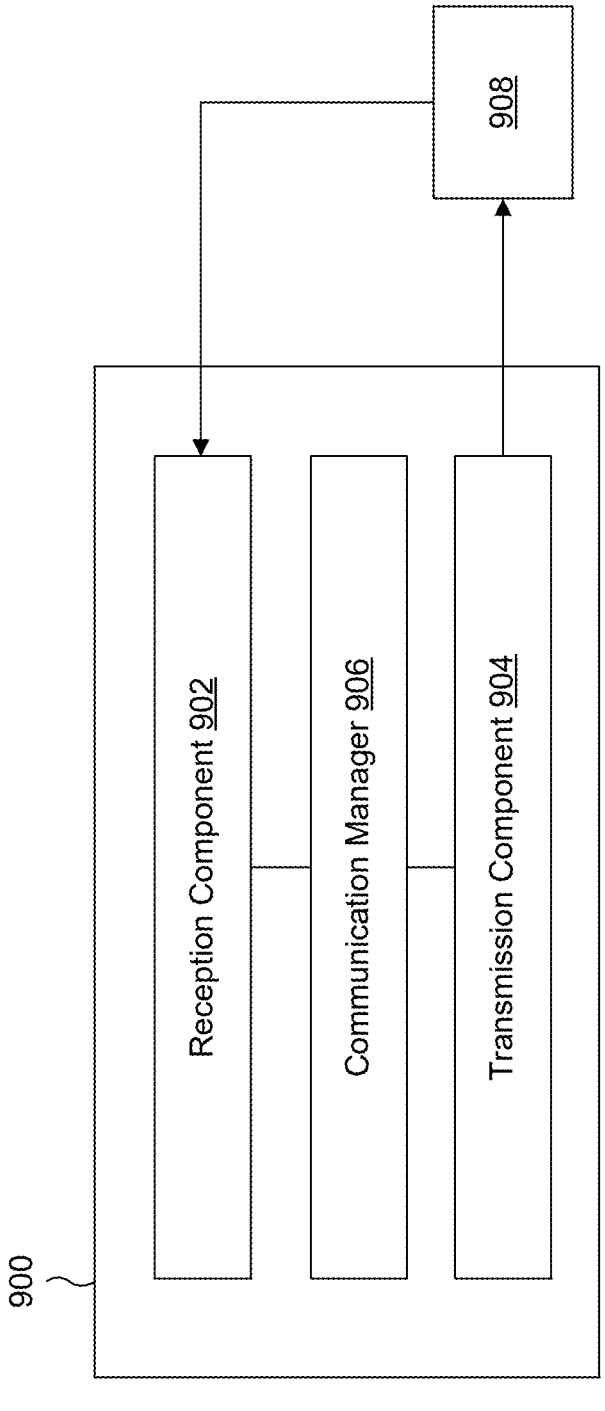
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE, or a UE may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 140 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIG. 7. Additionally, or alternatively, the apparatus 900 may be configured to perform one or more processes described herein, such as process 800 of FIG. 8. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 904 may be co-located with the reception component 902 in one or more transceivers.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The reception component 902 may receive, from a network node, an uplink grant that schedules a DG-PUSCH on a first component carrier. The transmission component 904 may transmit, to the network node, UTO-UCI indicating skipping of a CG-PUSCH on a second component carrier in a future CG-PUSCH occasion that overlaps in time with the DG-PUSCH scheduled on the first component carrier. The transmission component 904 may transmit, to the network node, the DG-PUSCH on the first component carrier, wherein the DG-PUSCH carries a PHR associated with a power headroom calculation based on an impact of the UTO-UCI indicating skipping of the CG-PUSCH.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a UE, comprising: receiving, from a network node, an uplink grant that schedules a DG-PUSCH on a first component carrier; transmitting, to the network node, UTO-UCI indicating skipping of a CG-PUSCH on a second component carrier in a future CG-PUSCH occasion that overlaps in time with the DG-PUSCH scheduled on the first component carrier; and transmitting, to the network node, the DG-PUSCH on the first component carrier, wherein the DG-PUSCH carries a PHR associated with a power headroom calculation based on an impact of the UTO-UCI indicating skipping of the CG-PUSCH.

Aspect 2: The method of Aspect 1, wherein the power headroom calculation is based on the impact of the UTO-UCI indicating skipping of the CG-PUSCH based at least in part on a time difference between the UTO-UCI and a first symbol of the DG-PUSCH satisfying a threshold.

Aspect 3: The method of Aspect 2, wherein the threshold has a value associated with a PUSCH preparation time.

Aspect 4: The method of Aspect 2, wherein the threshold has a value associated with a time offset.

Aspect 5: The method of Aspect 4, wherein the value associated with the time offset is defined in one or more wireless communication standards.

Aspect 6: The method of Aspect 4, wherein the value associated with the time offset is a function of a PUSCH preparation time.

Aspect 7: The method of any of Aspects 1-6, further comprising: receiving, from the network node, RRC signaling that configures a PHR reporting mode enabling the power headroom calculation to be based on the impact of the UTO-UCI indicating skipping of the CG-PUSCH.

Aspect 8: The method of any of Aspects 1-7, further comprising: transmitting, to the network node, information that indicates a capability to support a PHR reporting mode in which the power headroom calculation is based on the impact of the UTO-UCI indicating skipping of the CG-PUSCH.

Aspect 9: The method of any of Aspects 1-8, further comprising: scaling power associated with the DG-PUSCH transmitted on the first component carrier based on the impact of the UTO-UCI indicating skipping of the CG-PUSCH.

Aspect 10: The method of Aspect 9, wherein the power associated with the DG-PUSCH transmitted on the first component carrier is scaled based on the impact of the UTO-UCI indicating skipping of the CG-PUSCH based at least in part on a time difference between the UTO-UCI and a first symbol of the DG-PUSCH satisfying a threshold.

Aspect 11: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-10.

Aspect 12: An apparatus for wireless communication at a device, the apparatus comprising one or more memories and one or more processors coupled to the one or more memories, the one or more processors configured to cause the device to perform the method of one or more of Aspects 1-10.

Aspect 13: An apparatus for wireless communication, the apparatus comprising at least one means for performing the method of one or more of Aspects 1-10.

Aspect 14: A non-transitory computer-readable medium storing code for wireless communication, the code comprising instructions executable by one or more processors to perform the method of one or more of Aspects 1-10.

Aspect 15: A non-transitory computer-readable medium storing a set of instructions for wireless communication, the set of instructions comprising one or more instructions that, when executed by one or more processors of a device, cause the device to perform the method of one or more of Aspects 1-10.

Aspect 16: A device for wireless communication, the device comprising a processing system that includes one or more processors and one or more memories coupled with the one or more processors, the processing system configured to cause the device to perform the method of one or more of Aspects 1-10.

Aspect 17: An apparatus for wireless communication at a device, the apparatus comprising one or more memories and one or more processors coupled to the one or more memories, the one or more processors individually or collectively configured to cause the device to perform the method of one or more of Aspects 1-10.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. A method of wireless communication performed by a user equipment (UE), comprising:
   receiving, from a network node, an uplink grant that schedules a dynamic grant physical uplink shared channel (DG-PUSCH) on a first component carrier;
   transmitting, to the network node, unused transmission occasion uplink control information (UTO-UCI) indicating skipping of a configured grant physical uplink shared channel (CG-PUSCH) on a second component carrier in a future CG-PUSCH occasion that overlaps in time with the DG-PUSCH scheduled on the first component carrier; and
   transmitting, to the network node, the DG-PUSCH on the first component carrier, wherein the DG-PUSCH carries a power headroom report (PHR) associated with a power headroom calculation based on an impact of the UTO-UCI indicating skipping of the CG-PUSCH.

2. The method of claim 1, wherein the power headroom calculation is based on the impact of the UTO-UCI indicating skipping of the CG-PUSCH based at least in part on a time difference between the UTO-UCI and a first symbol of the DG-PUSCH satisfying a threshold.

3. The method of claim 2, wherein the threshold has a value associated with a physical uplink shared channel (PUSCH) preparation time.

4. The method of claim 2, wherein the threshold has a value associated with a time offset.

5. The method of claim 4, wherein the value associated with the time offset is defined in one or more wireless communication standards.

6. The method of claim 4, wherein the value associated with the time offset is a function of a physical uplink shared channel (PUSCH) preparation time.

7. The method of claim 1, further comprising:
   receiving, from the network node, radio resource control (RRC) signaling that configures a PHR reporting mode enabling the power headroom calculation to be based on the impact of the UTO-UCI indicating skipping of the CG-PUSCH.

8. The method of claim 1, further comprising:
   transmitting, to the network node, information that indicates a capability to support a PHR reporting mode in which the power headroom calculation is based on the impact of the UTO-UCI indicating skipping of the CG-PUSCH.

9. The method of claim 1, further comprising:
   scaling power associated with the DG-PUSCH transmitted on the first component carrier based on the impact of the UTO-UCI indicating skipping of the CG-PUSCH.

10. The method of claim 9, wherein the power associated with the DG-PUSCH transmitted on the first component carrier is scaled based on the impact of the UTO-UCI indicating skipping of the CG-PUSCH based at least in part on a time difference between the UTO-UCI and a first symbol of the DG-PUSCH satisfying a threshold.

11. A user equipment (UE) for wireless communication, comprising:
   one or more memories; and
   one or more processors, coupled to the one or more memories, configured to cause the UE to:
      receive, from a network node, an uplink grant that schedules a dynamic grant physical uplink shared channel (DG-PUSCH) on a first component carrier;
      transmit, to the network node, unused transmission occasion uplink control information (UTO-UCI) indicating skipping of a configured grant physical uplink shared channel (CG-PUSCH) on a second component carrier in a future CG-PUSCH occasion that overlaps in time with the DG-PUSCH scheduled on the first component carrier; and
      transmit, to the network node, the DG-PUSCH on the first component carrier, wherein the DG-PUSCH carries a power headroom report (PHR) associated with a power headroom calculation based on an impact of the UTO-UCI indicating skipping of the CG-PUSCH.

12. The UE of claim 11, wherein the power headroom calculation is based on the impact of the UTO-UCI indicating skipping of the CG-PUSCH based at least in part on a time difference between the UTO-UCI and a first symbol of the DG-PUSCH satisfying a threshold.

13. The UE of claim 12, wherein the threshold has a value associated with a physical uplink shared channel (PUSCH) preparation time.

14. The UE of claim 12, wherein the threshold has a value associated with a time offset.

15. The UE of claim 14, wherein the value associated with the time offset is defined in one or more wireless communication standards or a function of a physical uplink shared channel (PUSCH) preparation time.

16. The UE of claim 11, wherein the one or more processors are further configured to cause the UE to:
   receive, from the network node, radio resource control (RRC) signaling that configures a PHR reporting mode enabling the power headroom calculation to be based on the impact of the UTO-UCI indicating skipping of the CG-PUSCH.

17. The UE of claim 11, wherein the one or more processors are further configured to cause the UE to:

transmit, to the network node, information that indicates a capability to support a PHR reporting mode in which the power headroom calculation is based on the impact of the UTO-UCI indicating skipping of the CG-PUSCH.

18. The UE of claim 11, wherein the one or more processors are further configured to cause the UE to:

scale power associated with the DG-PUSCH transmitted on the first component carrier based on the impact of the UTO-UCI indicating skipping of the CG-PUSCH.

19. The UE of claim 18, wherein the power associated with the DG-PUSCH transmitted on the first component carrier is scaled based on the impact of the UTO-UCI indicating skipping of the CG-PUSCH based at least in part on a time difference between the UTO-UCI and a first symbol of the DG-PUSCH satisfying a threshold.

20. A non-transitory computer-readable medium storing a set of instructions for wireless communication, the set of instructions comprising:

one or more instructions that, when executed by one or more processors of a user equipment (UE), cause the UE to:

receive, from a network node, an uplink grant that schedules a dynamic grant physical uplink shared channel (DG-PUSCH) on a first component carrier;

transmit, to the network node, unused transmission occasion uplink control information (UTO-UCI) indicating skipping of a configured grant physical uplink shared channel (CG-PUSCH) on a second component carrier in a future CG-PUSCH occasion that overlaps in time with the DG-PUSCH scheduled on the first component carrier; and transmit, to the network node, the DG-PUSCH on the first component carrier, wherein the DG-PUSCH carries a power headroom report (PHR) associated with a power headroom calculation based on an impact of the UTO-UCI indicating skipping of the CG-PUSCH.

* * * * *